March 26, 1929.  H. C. PRIEBE  1,707,138
DRAFT GEAR
Filed Dec. 27, 1927   2 Sheets-Sheet 2
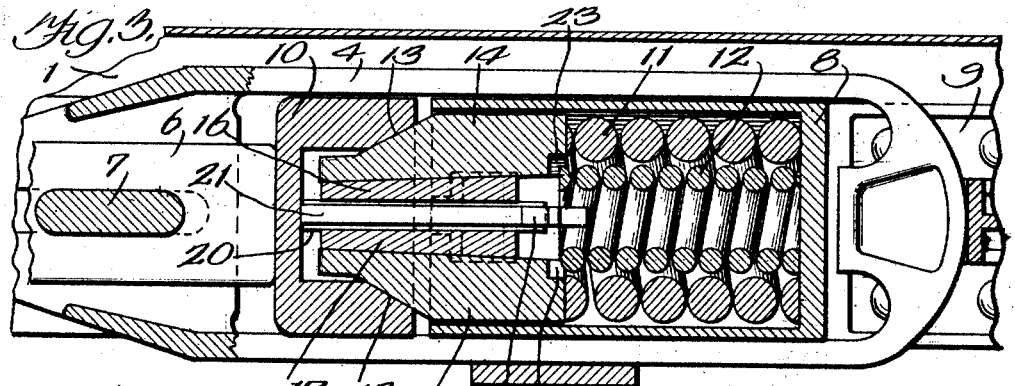
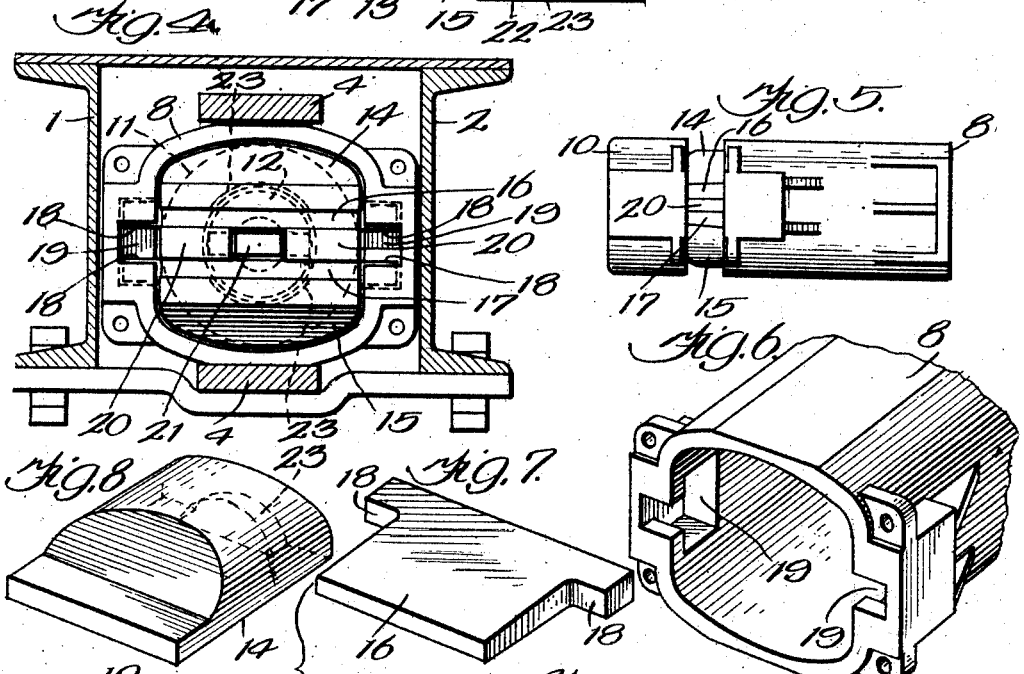
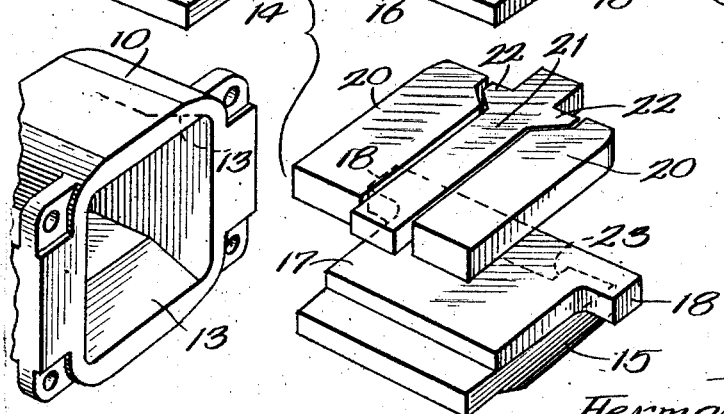
Inventor:
Herman C. Priebe
By G. L. Gragg Atty.

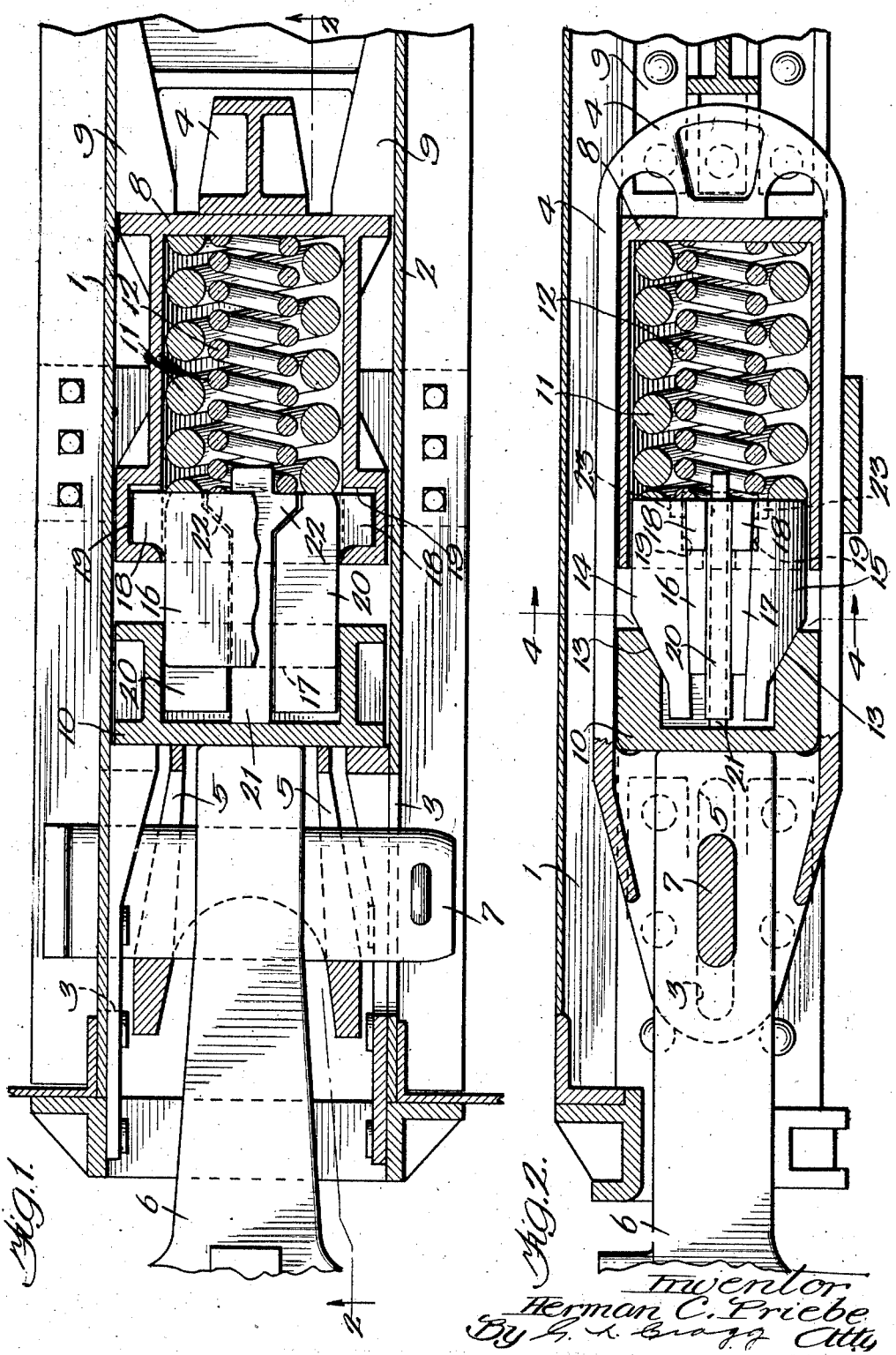

Patented Mar. 26, 1929.

1,707,138

UNITED STATES PATENT OFFICE.

HERMAN C. PRIEBE, OF BLUE ISLAND, ILLINOIS.

DRAFT GEAR.

Application filed December 27, 1927. Serial No. 242,595.

My invention relates to draft gears which are employed in coupling cars in a train and is inclusive of motion retarding friction producing mechanism containing an application spring, and also a motion retarding spring which functions independently of the friction producing mechanism.

In one aspect of the invention there is thus produced a friction draft gear and a spring draft gear which operate independently of each other. The two gears employ followers which are common thereto, one follower being movable longitudinally of the gear in response to draft strains of one direction and the other in response to draft strains of the opposite direction.

In the preferred embodiment of the invention, one of the followers is in the form of a spring barrel which houses the springs. The aforesaid application spring is preferably heavy in relation to the other spring which is preferably provided to function primarily as a release spring for completely opening the gear when the gear is released, this spring being in constant readiness to perform its function. Hitherto the friction producing blocks of friction gears, particularly in the case of friction gears of intercalated type, were apt to freeze together to hold the gears closed when they should be releasable to open adjustment, this result often following where brine in transit leaks from car bodies upon such gears.

I will explain my invention more fully by reference to the accompanying drawings in which Fig. 1 is a horizontal view, mainly in section, and with some parts broken away, illustrating a draft gear as it is preferably made in accordance with my invention, the gear illustrated being shown in open adjustment; Fig. 2 is a sectional view on line 2—2 of Fig. 1; Fig. 3 is a vertical sectional view illustrating the gear in closed adjustment; Fig. 4 is a sectional view on line 4—4 of Fig. 2; Fig. 5 is a side elevation of the two followers and elements therebetween; Fig. 6 is a perspective view of a portion of the follower that is in the form of a spring barrel; Fig. 7 is a perspective view illustrating some of the parts that are received within the spring barrel; Fig. 8 is a perspective view illustrating another part which enters the spring barrel; and Fig. 9 is a perspective view of the other follower.

The center sills 1 and 2 of a car desirably also constitute the draft sills of the gear. These center sills are formed each with a longitudinal slot 3. The coupler yoke 4 is desirably disposed with its sides in the same vertical plane. Each side of this coupler yoke is formed with a longitudinal slot 5 communicating with the slot 3 of the adjacent sill. The coupler stem 6 carries a key 7 that extends transversely of the sills and which passes through the slots 3 and 5. Where the coupler stem and the coupler yoke are in lost motion relation, the slots 5 are longer than the width of the key so that the key may move lengthwise of the coupler yoke to a limited extent and may engage either end of each of the slots 5 to move with the coupler yoke. The invention, however, is not to be limited to the lost motion relation of the coupler stem and yoke. The key, by being passed through the center sills as illustrated, takes part in supporting the coupler stem and yoke upon and in sliding relation to the sills, the slots 3 being sufficiently long to permit the coupler stem to move longitudinally of the sills throughout its operating range. Where the coupler yoke and coupler stem are in lost motion relation, the inner follower 8 moves with the coupler yoke, the inward motion of the yoke and of this follower being limited by the draft lugs or stops 9 which are carried by the center sills and engage said follower for this purpose. The outer follower 10 is engaged by the inner end of the coupler stem. One follower, the follower 8, moves outwardly in response to pulling strains and the other follower moves inwardly in response to buffing strains.

The follower 8 is desirably in the form of a barrel for receiving or housing the springs 11 and 12 of the gear. The follower 10 is desirably also hollow and also constitutes a friction producing element, the inner ends of opposite sides of this follower being sloped or converging forwardly as indicated at 13. Outer wedging blocks 14 and 15 have forwardly converging faces which are in wedging friction producing engagement with the wedging faces 13 of the follower 10. The spring 11 is desirably heavier than the spring 12 and constitutes an application spring which presses at one end upon the inner end of the follower 8 and at its other end directly upon the inner ends of the blocks 14 and 15 which are movable longitudinally of the gear with respect thereto.

A second friction producing element is interposed between the blocks 14, 15, this second friction producing element being desirably subdivided into two additional friction producing blocks 16 and 17 which taper forwardly. The blocks 16 and 17 are desirably of T shape, the lateral extensions 18 which form the heads of the T's being permanently received within the larger and innermost branches of the bayonet recesses 19 which are formed in the spring barrel at the outer end of the barrel. Two spaced apart spacing blocks 20, which are located abreast, are interposed between the blocks 16 and 17, the sides of each block which are next the blocks 16 and 17 being preferably parallel. These blocks 16 and 17 serve to hold the block extensions 18 within the bayonet recesses whereby said blocks 16 and 17 are caused to move longitudinally of the gear with the spring barrel. A bar 21 is interposed between the spacing blocks and is freely movable therebetween, said bar being thinner than the spacing blocks and also narrower than the space between said blocks. Said bar projects forwardly beyond the friction producing blocks and is maintained in constant engagement with the outer follower 10 by means of the lighter spring 12 which serves primarily as a release spring but desirably also as the application spring of the spring gear of which it forms a part. The spring 12 is shown as being surrounded by the spring 11 and as pressing upon the end wall of the spring barrel 8 which is also pressed upon by the spring 11. The inner end of the bar 21 is desirably in the shape of a cross, as illustrated most clearly in Fig. 7, the lateral and cross forming extensions 22 of the bar being engaged by the outer end of the release spring 12.

When the gear is under compression or is closed, the outer end of the spring 12 will enter the recesses 23 formed in the inner ends of the blocks 14 and 15, as indicated in Fig. 3, the inner engaging friction producing surfaces of the wedge blocks remaining in engagement. When the gear is relieved of draft strain, the spring 12 will assure the separation of the follower 10 from the wedging blocks 14 and 15 so that the gear will not stick, a result which is always assured since the bar 21 itself is free of sticking engagement with any of the parts that surround it.

Changes may be made without departing from the invention.

Having thus described my invention, I claim:

1. A draft gear including an application spring; a follower movable longitudinally of the gear in response to draft strains of one direction and pressed upon by said application spring; a second follower movable longitudinally of the gear in response to draft strains of the opposite direction; wedging blocks having wedging engagement with the second follower and movable longitudinally of the gear with respect thereto and also pressed upon by said spring which is interposed between the first follower and these blocks; two additional blocks interposed between the aforesaid blocks and respectively having wedging engagement therewith and joined with the first follower to move longitudinally of the gear therewith; two spaced apart spacing blocks located abreast and spacing the aforesaid additional blocks apart; a bar in thrusting engagement with the second follower and freely received in the space between said spacing blocks; and a release spring interposed between and pressing upon said bar and the first follower.

2. A draft gear including an application spring; a follower, in the form of a spring barrel, receiving said spring and movable longitudinally of the gear in response to draft strains of one direction and pressed upon by said application spring; a second follower movable longitudinally of the gear in response to draft strains of the opposite direction; wedging blocks having wedging engagement with the second follower and movable longitudinally of the gear with respect thereto and also pressed upon by said spring which is interposed between the first follower and these blocks; two additional blocks interposed between the aforesaid blocks and respectively having wedging engagement therewith, these additional blocks having lateral extensions and said barrel having bayonet recesses that receive said lateral extensions whereby these additional blocks are caused to move longitudinally of the gear with the spring barrel; two spaced apart spacing blocks located abreast and spacing the aforesaid additional blocks apart; a bar in thrusting engagement with the second follower and freely received in the space between said spacing blocks; and a release spring interposed between and pressing upon said bar and the first follower, said springs being within said barrel.

3. A draft gear including an application spring; a follower, in the form of a spring barrel, receiving said spring and movable longitudinally of the gear in response to draft strains of one direction and pressed upon by said application spring; a second follower movable longitudinally of the gear in response to draft strains of the opposite direction; wedging blocks having wedging engagement with the second follower and movable longitudinally of the gear with respect thereto and also pressed upon by said spring which is interposed between the first follower and these blocks; two additional blocks interposed between the aforesaid blocks and respectively having wedging engagement therewith, these additional blocks and said barrel having interlocking engagement whereby these additional blocks are caused to move longitudinally of the gear with the spring barrel; two spaced apart spacing blocks located abreast and spacing the aforesaid additional blocks apart; a bar in thrusting engagement with the second follower and freely received in the space between said spacing blocks; and a release spring interposed between and pressing upon said bar and the first follower, said springs being within said barrel.

4. A draft gear including an application spring; a follower, in the form of a spring barrel, receiving said spring and movable longitudinally of the gear in response to draft strains of one direction and pressed upon by said application spring; a second follower movable longitudinally of the gear in response to draft strains of the opposite direction; wedging blocks having wedging engagement with the second follower and movable longitudinally of the gear with respect thereto and also pressed upon by said spring which is interposed between the first follower and these blocks; two additional blocks interposed between the aforesaid blocks and respectively having wedging engagement therewith, these additional blocks and said barrel having interlocking engagement whereby these additional blocks are caused to move longitudinally of the gear with the spring barrel; two spaced apart spacing blocks located abreast and spacing the aforesaid additional blocks apart and holding them in engagement with said barrel; a bar in thrusting engagement with the second follower and freely received in the space between said spacing blocks; and a release spring interposed between and pressing upon said bar and the first follower, said springs being within said barrel.

5. A draft gear including an application spring; a follower, in the form of a spring barrel, receiving said spring and movable longitudinally of the gear in response to draft strains of one direction and pressed upon by said application spring; a second follower movable longitudinally of the gear in response to draft strains of the opposite direction; wedging blocks having wedging engagement with the second follower and movable longitudinally of the gear with respect thereto and also pressed upon by said spring which is interposed between the first follower and these blocks; two additional blocks interposed between the aforesaid blocks and respectively having wedging engagement therewith, these additional blocks and the spring barrel having inter-engagement whereby these additional blocks are caused to move longitudinally of the gear with the spring barrel; a spacing block located between the aforesaid additional blocks and holding them in engagement with the spring barrel; a bar in thrusting engagement with the second follower and freely received in the space between said spacing blocks; and a release spring interposed between and pressing upon said bar and the first follower, said springs being within said barrel.

In witness whereof, I hereunto subscribe my name.

HERMAN C. PRIEBE.